Patented Apr. 11, 1950

2,503,300

UNITED STATES PATENT OFFICE 2,503,300

DEVELOPMENT OF SULFURIC ACID ESTERS OF LEUCO VAT DYES USING HYDROXYL-AMMONIUM SALTS

Herbert L. Sanders, Easton, Pa., assignor to General Aniline & Film Corporation, New York, N. Y., a corporation of Delaware No Drawing. Application July 2, 1947,
Serial No. 758,701

4 Claims. (Cl. 8—70)

This invention relates to vat dyes and more particularly to the development of leuco sulfuric acid esters of vat dyes and compositions of same containing developing agents.

Vat dyes, as such, are insoluble in water and for most dyeing purposes it is generally necessary to solubilize the dyes by reducing them in alkaline solution to their leuco forms. This conversion is effected in known manner in the presence of large concentrations of alkali. From the aqueous alkaline solutions in which the leuco bodies have been formed the fibers are impregnated with the reduced dye which is then dyed or fixed on the fiber by oxidation, such as exposure of the dyed fiber to the oxygen of the air. This process of obtaining dyeings from the normally insoluble vat dyes has given good results in many dyeing operations, but it was found to be impracticable in printing processes involving the use of vat dyes. It was also found to be subject to some disadvantages inherent in the method of reducing the insoluble vat dyes to the soluble leuco form. For instance, the concentration of alkali necessary for the reduction caused damage to some types of fibers, thereby limiting the scope of the process. Furthermore, since the leuco form of the dye is easily reconverted to the insoluble vat dye by oxidation, the reduction solutions are very readily oxidizable and for that reason unstable.

Bader and Sunder in their Patent 1,448,251 have set forth a process which overcomes these disadvantages of printing with vat dyes as well as other disadvantages mentioned in their patent. The Bader and Sunder process consists essentially in preparing the sulfuric acid ester of the leuco form of the dye. According to that process, the leuco bodies of the vat dyes are esterified by means of polybasic acids having at least one acid group which does not participate in the esterification but remains free and capable of forming salts. Thus, for instance, chlorosulfonic acid may be caused to react on the leuco vat dyes in the presence of a tertiary base with or without the use of an indifferent diluting agent. The sulfuric acid ester of the leuco vat dye obtained is stable, especially against oxidation by air. This form of the reduced vat dye may be applied to a fabric from an aqueous solution or in the form of a printing paste, thus eliminating the necessity for contacting the fabric with strong alkalis. The dye is developed on the fiber by the action of a mild oxidizing agent, such as an acidic solution of ferric chloride, potassium bichromate or chloride of lime. The dye will be rapidly and fully developed and will have the same valuable properties of fastness as would have been obtained from the corresponding vat dyes.

In a more recently developed method of applying the sulfuric acid esters of leuco vat dyes in printing technique, the vat dye is developed on the fiber by steaming. In this technique, the print paste contains an oxidizing agent and a material which will generate acid when steamed. The combination of the oxidizer and liberated acid will develop the vat dye at high temperatures. Oxidizing agents which have been used for this purpose include sodium chlorate, aluminum chlorate, ammonium chlorate, sodium nitrite, ammonium bichromate and copper sulfate. In practice, sodium chlorate is used almost exclusively. Many acid generating compounds have been suggested, including ammonium thiocyanate, ammonium sulfate, ammonium lactate, diethyl tartrate, alkylamine salts, amides, aryl sulfonyl chlorides, chlorhydrin and others. In commercial practice, ammonium thiocyanate and diethyl tartrate are the most widely used.

A disadvantage of the steaming method of development is the fact that the sulfuric acid esters of leuco vat dyes differ greatly in their reaction to the acidifying agents. Thus, certain of these colors require ammonium thiocyanate for satisfactory development, while others will not develop properly unless diethyl tartrate is employed and still others may require an entirely different acid generating agent, such as ammonium oxalate in order to obtain the best results. This selectivity of the vat dye derivatives requires the maintenance of large stocks of different acid generating agents by the printer and also precludes the mixing together of certain of the colors where special effects are desired in view of the fact that the developers for the colors which it is desired to mix are incompatible.

It has now been found that a new class of acid generating agents may be employed as developers for sulfuric acid esters of leuco vat dyes, which are the hydroxylammonium salts. This class of acid binding agents or developers may be represented by the formula NHOHX where X is the acid radical of a strong acid, such as the chloride, sulfate and thiocyanate radicals. This class of acid generating agents is of wider applicability and will develop any leuco sulfuric acid ester of a vat dye without the discrimination characteristic of prior developing agents.

Examples of hydroxylammonium salts which may be used as developers for the vat dye derivatives include hydroxylammonium sulfate, hydroxylammonium chloride and hydroxylammonium thiocyanate. The hydroxylammonium salts of weak acids, such as hydroxylammonium gluconate, are not as effective as the hydroxylammonium salts of strong acids and do not have the property of universal application to all sulfuric acid esters of leuco vat dyes. The hydroxylammonium salts of weak acids may be of interest for the development of particular vat dye derivatives as in the case of the prior art simple ammonium salts as described in British Patent 281,336 or the amine salts as disclosed in U. S. P. 2,008,966.

The following examples will serve to further illustrate my invention. Although there are a great variety of sulfuric acid esters of leuco vat dyes which could be described in these examples, a few representative vat dye derivatives have been selected and the results obtained compared with prior art developers. It is therefore understood that the examples do not constitute limitations and that the scope of the invention is not limited, except as defined in the appended claims.

EXAMPLE 1

*Development of Algosol Golden Yellow IGK (sulfuric acid ester of leuco 3,4,8,9-dibenzpyrene-5,10 quinone)*

The dye is incorporated into a print paste having the following composition 4 grams Algosol Golden Yellow IGK [1]
4 grams Glyecine A
1 gram hydroxylammonium sulfate
1 gram sodium chlorate
0.01 gram ammonium vanadate
90 grams starch tragacanth thickener

[1] Registered trade-mark.

A portion of this paste is printed onto a white cotton fabric by using an engraved roller. The printed fabric is then dried, steamed for 5 minutes in a Mather-Platt steam ager and the developed print washed. An excellent development of the color is obtained.

In this case it is found that ammonium thiocyanate and diethylaminehydrochloride when substituted for the hydroxylammonium sulfate will both precipitate the vat dye derivative out of solution, thereby causing poor prints to be obtained.

EXAMPLE 2

*Development of Algosol Brown IBR (leuco ester of carbazolized trianthraquinonyl diimide)*

A print paste of this dye is made up having the following composition:

4 grams Algosol Brown IBR
4 grams Glyecine A
4 grams urea
1 gram hydroxylamine hydrochloride
1 gram sodium chlorate
0.01 gram ammonium vanadate
86 grams starch tragacanth thickener After printing, drying and steaming in the manner described in Example 1, bright print colors are obtained of excellent strength. Using diethyl tartrate, no development is obtained.

EXAMPLE 3

*Development of Algosol Brilliant Orange IRKL (leuco ester of dibromanthanthrone)*

This dye is incorporated into a print paste having the following composition:

4 grams Algosol Brilliant Orange IRKL
4 grams Glyecine A
4 grams urea
1 gram hydroxylammonium thiocyanate
1 gram sodium chlorate
0.01 gram ammonium vanadate
86 grams starch tragacanth thickener After printing, drying and steaming in the usual manner as set forth in Example 1, excellent prints are obtained. Neither of the common acidifying agents (ammonium thiocyanate or diethyl tartrate) gave satisfactory results.

The hydroxylammonium thiocyanate employed in this example may be obtained by adding a solution of barium thiocyanate to a solution of hydroxylammonium sulfate and filtering off the precipitated barium sulfate.

I claim:

1. A process of developing color on a textile material from a printing paste containing the leuco sulfuric acid ester of 3,4,8,9-dibenzpyrene-5,10-quinone which comprises steaming the textile surface carrying the printing paste in the presence of a hydroxylammonium salt having the formula $$NH_3OHX$$

where X is the acid radical of the group consisting of chloride, sulfate, and the thiocyanate radicals.

2. A process of developing color on a textile material from a printing paste containing a leuco sulfuric acid ester of 3,4,8,9-dibenzpyrene-5,10-quinone which comprises steaming the textile surface carrying the printing paste in the presence of hydroxylammonium sulfate.

3. A composition of matter comprising in mixture an undeveloped textile printing paste containing the leuco sulfuric acid ester of 3,4,8,9-dibenzpyrene-5,10-quinone and a hydroxylammonium salt having the formula $$NH_3OHX$$

where X is the acid radical of the group consisting of chloride, sulfate, and the thiocyanate radicals.

4. A composition of matter comprising in mixture an undeveloped textile printing paste containing the leuco sulfuric acid ester of 3,4,8,9-dibenzpyrene-5,10-quinone and hydroxylammonium sulfate.

HERBERT L. SANDERS.

REFERENCES CITED

The following references are of record in the file of this patent:

UNITED STATES PATENTS

| Number | Name | Date |
|---|---|---|
| 1,747,107 | Niederhausern | Feb. 11, 1930 |
| 2,224,280 | Verity | Dec. 10, 1940 |